United States Patent Office 3,792,064
Patented Feb. 12, 1974

3,792,064
NOVEL GLUCURONIC ACID DERIVATIVES AND PROCESS FOR THE PREPARATION THEREOF
Rokuro Kaifu, Kiyoshige Ochi, Renpei Nagashima, and Yoshikazu Hinohara, Tokyo, Japan, assignors to Chugai Seiyaku Kabushiki Kaisha, Tokyo, Japan
No Drawing. Filed Oct. 28, 1970, Ser. No. 84,912
Claims priority, application Japan, Nov. 1, 1969, 44/87,372
Int. Cl. C07d 7/00
U.S. Cl. 260—345.7    6 Claims

ABSTRACT OF THE DISCLOSURE

Novel glucuronic acid derivatives of the formula

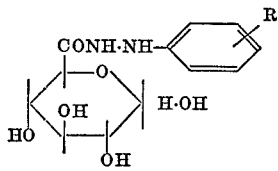

wherein R is selected from the group consisting of a lower alkyl group, halogen and a lower alkoxy group, which are useful for the prevention of hepato-cellular necrosis, are prepared by reacting a lower alkyl ester of glucuronic acid or glucurono lactone with a correspondingly substituted-phenylhydrazine to produce a substituted-phenylhydrazone of glucuronic acid substituted-phenylhydrazide of the formula

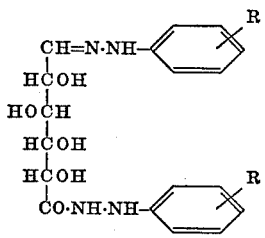

wherein R's are as defined above, and removing the substituted-phenylhydrazono radical at $C_1$ position.

BACKGROUND OF THE INVENTION

This invention relates to novel organic compounds useful as pharmaceuticals, especially for the prevention of hepato-cellular necrosis. More particularly, this invention relates to novel glucuronic acid derivatives represented by the formula

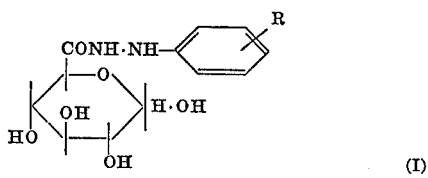

wherein R is selected from the group consisting of a lower alkyl group, halogen and a lower alkoxy group, and to a process for the preparation thereof.

SUMMARY OF THE INVENTION

In accordance with the present invention, the novel glucuronic acid derivatives represented by the above formula are prepared by reacting a lower alkyl ester of glucuronic acid or a glucuronolactone with a substituted-phenylhydrazine of the formula

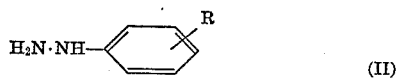

wherein R is as defined above, to produce a substituted-phenylhydrazone of glucuronic acid substituted-phenylhydrazide of the formula

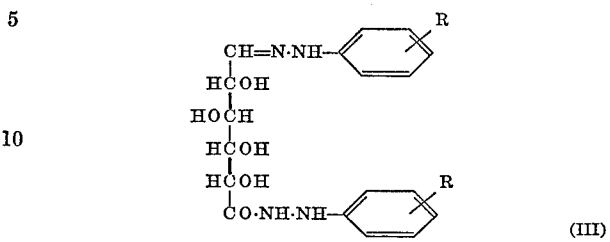

wherein R's are as defined above, and removing the substituted-phenylhydrazono radical at $C_1$ position from the resulting intermediate of the Formula III above.

DETAILED EXPLANATION OF THE INVENTION

The reaction between the lower alkyl ester of glucuronic acid or the glucuronolactone and the substituted-phenylhydrazine can be carried out in water or an appropriate organic solvent such as, for example, alcohol by heating the reactants, in particular, by heating at reflux. Preferably, the starting materials are used in the molar ratio of two or more moles of the substituted phenylhydrazine per one mole of the lower alkyl ester of glucuronic acid or the glucuronolactone. The subsequent removal of the substituted-phenylhydrazono radical at $C_1$ position may be effected by using the substituted-phenylhydrazone of glucuronic acid substituted-phenylhydrazide intermediate isolated from the reaction mixture as crystals or using the reaction mixture as it is without the isolation of the intermediate.

The removal of the substituted-phenylhydrazono radical at $C_1$ position can be effected in the usual manner, for example, by the reaction with an aldehyde reagent, especially, benzaldehyde. In the case of the isolated crystalline substituted-phenylhydrazone of glucuronic acid substituted-phenylhydrazide, the removal of the substituted-phenylhydrazono radical is preferably effected by first dissolving the crystals in alcohol such as methanol, ethanol and the like and then adding more than an equimolar amount of benzaldehyde to the solution followed by heat-refluxing of the resulting mixture.

As set forth above, the removal of the substituted-phenylhydrazono radical can also be effected by using the reaction solution from the first step without isolating the intermediate. This can be done by heat-refluxing the reaction solution together with an excess of benzaldehyde.

The glucuronic acid substituted-phenylhydrazides of this invention, which are novel compounds not previously disclosed in literature, exhibit low toxicity and high stability and are extremely useful as pharmaceuticals, in particular, for the treatment of liver function disorder.

The present invention is further illustrated by the following experiment and examples but these are given for exemplifying the specific embodiments only and are not to be construed as limiting the scope of the invention.

EXPERIMENT

Mice were administered some of the D-glucuronic acid hydrazide derivatives of this invention together with carbon tetrachloride via the routes indicated in Table 1 below. After 20 hours of such administration, Evans Blue dye was administered intravenously and the effect in preventing the hepato-cellular necrosis was determined by observing the leakage of the dye into liver and the blood level of G.O.T. (glutamic oxaloacetic transaminase) and G.P.T. (glutamic pyruvic transaminase). The results obtained are shown in Table 1 in terms of the percent prevention of necrosis (average of five mice in each case). The dose of carbon tetrachloride administered was 0.2 ml. per kg. of body weight.

TABLE 1.—EFFECT IN PREVENTING HEPATO-CELLULAR NECROSIS IN MICE BY ADMINISTRATION OF D-GLUCURONIC ACID HYDRAZIDE DERIVATIVES

| Compound | Dose mmole/ kg. | Route of administration | Percent prevention of necrosis (percent) | | |
|---|---|---|---|---|---|
| | | | Dye | GOT | GPT |
| D-glucuronic acid, p-chlorophenylhydrazide | 1 | I.p. | 100 | 99 | 86 |
| D-glucuronic acid, p-ethoxyphenylhydrazide | 1 | I.p. | 100 | 99 | 98 |
| D-glucuronic acid, p-tolylhydrazide | 1 | Oral | 1.1 | 38 | 19.5 |
| D-glucuronic acid, p-tolylhydrazide | 1 | I.p. | 92 | 91 | 83 |
| D-glucuronic acid, m-tolylhydrazide | 2 | I.p. | 98 | | |
| D-glucuronic acid, p-bromophenylhydrazide | 1 | I.p. | 69 | | |

EXAMPLE 1

(A) Six grams of p-chlorophenylhydrazine hydrochloride were suspended in 20 ml. of ethanol, and to this was added a solution of 0.77 g. of sodium metal dissolved in 20 ml. of ethanol. The precipitated sodium chloride was then filtered, and the filtrate was concentrated under reduced pressure to give a residue. Thirty ml. of water and 2 g. of D-glucuronolactone were added to the residue and the mixture was heated for 5 minutes in a water bath. The resulting reaction mixture was washed with ether, concentrated under reduced pressure, and ethanol was added to the residue to give 4.3 g. (84% yield) of crystalline p-chlorophenylhydrazone of D-glucuronic acid p-chlorophenylhydrazide which was then recrystallized from ethanol. Melting point, 173° C. (with decomposition).

Analysis.—Calc'd for $C_{18}H_{20}O_5N_4Cl_2$ (percent): C, 48.77; H, 4.54; N, 12.64. Found (percent): C, 48.40; H, 4.49; N, 12.58.

(B) Six grams of p-chlorophenylhydrazine hydrochloride were suspended in 20 ml. of ethanol, and to this was added a solution of 0.77 g. of sodium metal dissolved in 20 ml. of ethanol. The precipitated sodium chloride was then filtered and, after adding 1.5 g. of D-glucuronic acid ethyl ester to the filtrate, the filtrate was refluxed for 30 minutes. The reaction solution was concentrated to about one-half of its original volume and cooled to give 2.1 g. (71% yield) of crystalline p-chlorophenylhydrazone of D-glucuronic acid p-chlorophenylhydrazide which was then recrystallized from ethanol. Melting point, 172–173° C. (with decomposition).

Analysis.—Calc'd for $C_{18}H_{20}O_5N_4Cl_2$ (percent): C, 48.77; H, 4.54; N, 12.64. Found (percent): C, 48.59; H, 4.50; N, 12.83.

(C) 1.5 g. of p-chlorophenylhydrazone of D-glucuronic acid p-chlorophenylhydrazide p-chlorophenylhydrazide obtained by the procedure shown in (A) or (B) above was suspended in 20 ml. of 75% ethanol and 1 ml. of benzaldehyde was added to the suspension which was then refluxed for 3 hours. The reaction solution was concentrated to 5 ml.; 20 ml. of water was then added to the concentrate, and the resulting mixture was washed with ether. The aqueous layer was decolored with active carbon and concentrated under reduced pressure. The addition of ethanol to the residue yielded 930 mg. (86% yield) of crystalline D-glucuronic acid p-chlorophenylhydrazide which was then recrystallized from ethanol. Melting point, 175° C. (with decomposition).

Analysis.—Calc'd for $C_{12}H_{15}O_6N_2Cl$ (percent): C, 45.08; H, 4.73; N, 8.76. Found (percent): C, 44.30; H, 5.19; N, 8.62.

EXAMPLE 2

(A) One gram of D-glucuronolactone was suspended in 20 ml. of ethanol, and to this was added 6 g. of p-ethoxyphenylhydrazine followed by refluxing for 30 minutes. The reaction solution was ice-cooled to give 2.1 g. (81% yield) of crystalline p-ethoxyphenylhydrazone of D-glucuronic acid p-ethoxyphenylhydrazide. Melting point, 164° C. (with decomposition).

Analysis.—Calc'd for $C_{22}H_{30}O_7N_4$ (percent): C, 57.13; H, 6.54; N, 12.12. Found (percent): C, 57.31; H, 6.75; N, 12.11.

(B) Nine grams of p-ethoxyphenylhydrazine were dissolved in 25 ml. of ethanol, and to this was added 1.5 g. of D-glucuronic acid methyl ester followed by refluxing for 30 minutes. The reaction solution was cooled to give 2.6 g. (79% yield) of crystalline p-ethoxyphenylhydrazone of D-glucuronic acid p-ethoxyphenylhydrazide. Melting point, 164–165° C. (with decomposition).

Analysis.—Calc'd for $C_{22}H_{30}O_7N_4$ (percent): C, 57.13; H, 6.54; N, 12.12. Found (percent): C, 57.31; H, 6.75; N, 12.11.

(C) Nine grams of p-ethoxyphenylhydrazone of D-glucuronic acid p-ethoxyphenylhydrazide obtained by the procedure shown in (A) or (B) above was suspended in 100 ml. of 75% ethanol and 6 ml. of benzaldehyde was added to the suspension followed by refluxing for 3 hours. The reaction solution was concentrated to 25 ml.; 100 ml. of water was then added to the concentrate, and the resulting mixture was washed with ether. The aqueous layer was decolored with active carbon and concentrated under reduced pressure. The addition of ethanol to the residue yielded 5.7 g. (90% yield) of crystalline D-glucuronic acid p-ethoxyphenylhydrazide which was then recrystallized from ethanol. Melting point, 167–168° C. (with decomposition).

Analysis.—Calc'd for $C_{14}H_{20}O_7N_2$ (percent): C, 51.21; H, 6.14; N, 8.53. Found (percent): C, 50.09; H, 6.51; N, 8.62.

EXAMPLE 3

(A) 12.7 g. of p-tolylhydrazine hydrochloride and 6.6 g. of sodium acetate anhydride were dissolved in 100 ml. of ethanol, and to this was added 3.5 g. of D-glucuronolactone followed by refluxing for one hour. The reaction solution was cooled, and the precipitated crystals were filtered and washed with water to give 6.1 g. (76% yield) of p-tolylhydrazone of D-glucuronic acid p-tolyhydrazide which was then recrystallized from pyridine-ethanol. Melting point, 165–166° C. (with decomposition).

Analysis.—Calc'd for $C_{20}H_{26}O_5N_4$ (percent): C, 59.69; H, 6.51; N, 13.92. Found (percent): C, 59.57; H, 6.47; N, 14.21.

(B) 3.16 g. of p-tolylhydrazine hydrochloride was suspended in 15 ml. of ethanol, and to this was added a solution of 0.46 g. of sodium metal dissolved in 15 ml. of ethanol. The precipitated sodium chloride was then filtered, and 0.7 g. of D-glucuronic acid methyl ester was added to the filtrate followed by refluxing for 30 minutes. The reaction solution was cooled to give 1 g. of crystalline p-tolylhydrazone of D-glucuronic acid p-methylphenylhydrazone p-tolylhydrazide which was then recrystallized from ethanol. Melting point, 165–166° C. (with decomposition).

Analysis.—Calc'd for $C_{20}H_{26}O_5N_4$ (percent): C, 59.69; H, 6.51; N, 13.92. Found (percent): C, 59.57; H, 6.51; N, 13.99.

(C) Four grams of p-tolylhydrazone of D-glucuronic acid p-tolylhydrazide obtained by the procedure shown in (A) or (B) above was suspended in 40 ml. of 75% ethanol and 3 ml. of benzaldehyde was added to the suspension followed by refluxing for 3 hours. 30 ml. of water was then added to the reaction solution and the resulting mixture was washed with ether. The aqueous layer was decolored with active carbon and concentrated under reduced pressure to give 2.4 g. of D-glucuronic acid p-tolylhydrazide which was then recrystallized from ethanol. Melting point, 177–179° C. (with decomposition).

*Analysis.*—Calc'd for $C_{13}H_{18}O_6N_2$ (percent): C, 52.35; H, 6.08; N, 9.39. Found (percent): C, 51.77; H, 6.72; N, 9.82.

EXAMPLE 4

(A) 15.8 g. of m-tolylhydrazine hydrochloride were suspended in 75 ml. of ethanol, and to this was added a solution of 2.3 g. of sodium metal dissolved in 75 ml. of ethanol. The precipitated sodium chloride was then filtered and, after adding 3.5 g. of D-glucuronolactone to the filtrate, the filtrate was refluxed for 30 minutes. The resulting reaction mixture was concentrated under reduced pressure, and the residue was washed successively with petroleum ether and ether to give 6.9 g. of crystalline m-tolylhydrazone of D-glucuronic acid m-tolylhydrazide which was then recrystallized from ethanol. Melting point, 158–159° C. (with decomposition).

*Analysis.*—Calc'd for $C_{20}H_{26}O_5N_4$ (percent): C, 59.69; H, 6.51; N, 13.92. Found (percent): C, 59.90; H, 6.50; N, 14.18.

(B) 3.16 g. of m-tolylhydrazine hydrochloride was suspended in 15 ml. of ethanol, and to this was added a solution of 0.46 g. of sodium metal dissolved in 15 ml. of ethanol. The precipitated sodium chloride was then filtered and, after adding 0.7 g. of D-glucuronic acid methyl ester to the filtrate, the filtrate was refluxed for 30 minutes. The reaction solution was concentrated under reduced pressure, and the residue was washed successively with petroleum ether and ether to give 0.95 g. of crystalline m-tolylhydrazone of D-glucuronic acid m-tolylhydrazide which was then recrystallized from ethanol. Melting point, 158–159° C. (with decomposition).

*Analysis.*—Calc'd for $C_{20}H_{26}O_5N_4$ (percent): C, 59.69; H, 6.51; N, 13.92. Found (percent): 59.72; H, 6.43; N, 14.03.

(C) Two grams of m-tolylhydrazone of D-glucuronic acid m-tolylhydrazide obtained by the procedure shown in (A) or (B) above were suspended in 20 ml. of 75% ethanol and 1.5 ml. of benzaldehyde was added to the suspension followed by refluxing for 3 hours. The reaction solution was concentrated to 5 ml.; 20 ml. of water was then added to the concentrate, and the resulting mixture was washed with ether. The aqueous layer was concentrated under reduced pressure to give 1.3 g. of crystalline D-glucuronic acid m-tolylhydrazide. Melting point, 168–169° C. (with decomposition).

*Analysis.*—Calc'd for $C_{13}H_{18}O_6N_2$ (percent): C, 52.34; H, 6.08; N, 9.39. Found (percent): C, 51.93; H, 6.39; N, 9.42.

EXAMPLE 5

(A) Three grams of D-glucuronolactone were suspended in 45 ml. of ethanol, and to this was added 8 g. of p-bromophenylhydrazine followed by refluxing for one hour. The reaction solution was concentrated under reduced pressure, and ether was added to the residue to give 6.9 g. (76% yield) of crystalline p-bromophenylhydrazone of D-glucuronic acid p-bromophenylhydrazide which was then recrystallized from ethanol. Melting point, 156–157° C. (with decomposition).

*Analysis.*—Calc'd for $C_{18}H_{20}O_5N_4Br_2$ (percent): C, 40.62; H, 3.79; N, 10.53. Found (percent): C, 40.74; H, 3.66; N, 10.32.

(B) 1.2 g. of p-bromophenylhydrazone of D-glucuronic acid p-bromophenylhydrazide obtained by the procedure shown in (A) above was suspended in 20 ml. of 75% ethanol and 1 ml. of benzaldehyde was added to the suspension followed by refluxing for 3 hours. The reaction solution was concentrated to about 5 ml.; 10 ml. of water was then added to the concentrate, and the resulting mixture was washed with ether. The aqueous layer was concentrated under reduced pressure, and ethanol-ether was added to the resulting residue to give 0.7 g. (85% yield) of crystalline D-glucuronic acid p-bromophenylhydrazide which was then recrystallized from ethanol. Melting point, 177–179° C. (with decomposition).

*Analysis.*—Calc'd for $C_{12}H_{15}O_6N_2Br$ (percent): C, 39.69; H, 4.16; N, 7.71. Found (percent): C, 39.69; H, 4.23; N, 7.39.

What is claimed is:
1. Glucuronic acid represented by the formula

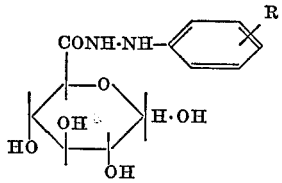

wherein R is selected from the group consisting of a lower alkyl group, halogen and a lower alkoxy group.

2. D-glucuronic acid p-chlorophenylhydrazide in accordance with claim 1.

3. D-glucuronic acid p-ethoxyphenylhydrazide in accordance with claim 1.

4. D-glucuronic acid p-tolylhydrazide in accordance with claim 1.

5. D-glucuronic acid m-tolylhydrazide in accordance with claim 1.

6. D-glucuronic acid p-bromophenylhydrazide in accordance with claim 1.

References Cited

Akagi et al.: "Chem. Abst.," vol. 58, 1963, p. 570(b) and (c).

Nitta et al.: "Chem. Abst.," vol. 58, 1963, p. 5630(b), (c) and (d).

Nitta et al.: "Chem. Abst.," vol. 59, p. 6508(b), 1964.

Hokoku: "Chem. Abst.," vol. 63, 1965, p. 11256f.

JOHNNIE R. BROWN, Primary Examiner

U.S. Cl. X.R.

260—209 R; 424—283